D. G. Fowler.
Carding Hooks & Eyes.
No. 38259     Patented Apr. 21, 1863.
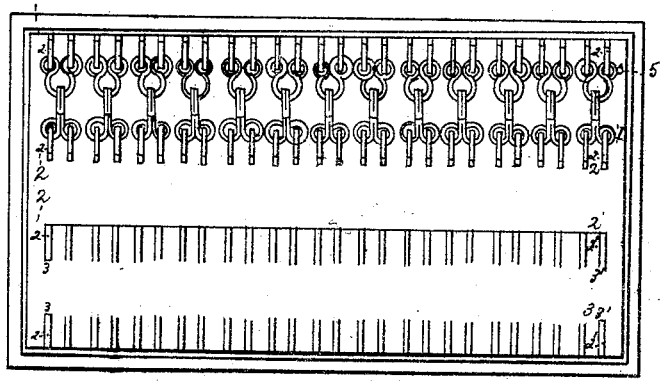
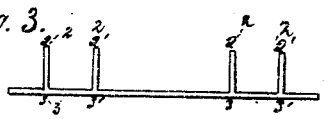
Witnesses
L. A. Roberts
H. A. Albee
Inventor
D. G. Fowler Jr
By Thos P New Atty

UNITED STATES PATENT OFFICE.

DE GRASSE FOWLER, JR., OF NORTHFORD, CONNECTICUT, ASSIGNOR TO HIMSELF AND MERWIN FOWLER.

IMPROVEMENT IN PAPER CARDS FOR HOOKS AND EYES.

Specification forming part of Letters Patent No. 38,259, dated April 21, 1863.

*To all whom it may concern:*

Be it known that I, DE GRASSE FOWLER, Jr., of Northford, in the county of New Haven, in the State of Connecticut, have invented an Improvement in Securing Hooks and Eyes to Cards; and I do hereby declare that the following is a full and exact description thereof, reference being had to the accompanying drawings, and to the letters of reference marked thereon.

This improvement consists in making in the card double rows of vertical incisions on the two sides and one end of narrow rectangles, thereby detaching, with the exception of one end, narrow tongues or strips projecting from the card, by which the hooks and eyes are attached to the card, as hereinafter described.

In the drawings, Figure 1 represents the top surface of the card, with one row of hooks and eyes attached. Fig. 2 represents a vertical end view of the same. Fig. 3 represents and end view, with the tongues or strips raised so as to pass through the loop-holes of the hooks and eyes.

1 is the card. 2 2', &c., are the tongues or strips attached to the card 1 by being uncut at 3 3', &c. 4 4, &c., are the hooks and eyes. The tongues or strips 2 2' are less in width than the diameter of the loop-holes 5 5', &c., of the hooks and eyes. That portion of the tongues or strips 2 2' remaining attached to the card in one row is parallel to similar portions in the opposite row, and each row is distant from the other the length between the loop-holes 5 5' of the hooks and eyes when in position, as shown. The proximity of these tongues or strips in each row is regulated by the distance apart of the loop-holes in each hook and eye.

To attach the hooks and eyes to the card, the tongues and strips are first raised to a vertical position, or at right angles to the plane of the card, and each hook and eye, being connected, is dropped on the card so that each loop-hole embraces one of four of these tongues or strips, which are then pressed flat in the direction of the incision, thus securing the hook and eye to the card.

I claim—

The attachment of hooks and eyes by the means of tongues or strips, partially separated and projecting from the card, substantially as hereinbefore set forth.

DE GRASSE FOWLER, JR.

Witnesses:
L. A. ROBERTS.
THOS. P. HOW.